United States Patent
Qian et al.

(10) Patent No.: US 11,992,934 B2
(45) Date of Patent: May 28, 2024

(54) STEREO VIDEO IN AUGMENTED REALITY

(71) Applicant: MediVis, Inc., New York, NY (US)

(72) Inventors: Long Qian, Brooklyn, NY (US);
Christopher Morley, New York, NY (US); Osamah Choudhry, New York, NY (US)

(73) Assignee: Medivis, Inc., New York, NY (US)

( * ) Notice: Subject to any disclaimer, the term of this patent is extended or adjusted under 35 U.S.C. 154(b) by 0 days.

(21) Appl. No.: 17/961,423

(22) Filed: Oct. 6, 2022

(65) Prior Publication Data

US 2023/0024958 A1 Jan. 26, 2023

Related U.S. Application Data

(63) Continuation-in-part of application No. 17/723,437, filed on Apr. 18, 2022, now Pat. No. 11,656,690, and a continuation-in-part of application No. 17/395,233, filed on Aug. 5, 2021, now Pat. No. 11,857,274, said application No. 17/723,437 is a continuation-in-part of application No. 17/194,191, filed on Mar. 5, 2021, said application No. 17/395,233 is a continuation-in-part of application No. 17/148,522, filed on Jan. 13, 2021.

(51) Int. Cl.
*G06T 19/00* (2011.01)
*B25J 9/16* (2006.01)
*B25J 13/08* (2006.01)
*G06F 3/01* (2006.01)

(52) U.S. Cl.
CPC .............. *B25J 13/08* (2013.01); *B25J 9/1635* (2013.01); *G06F 3/017* (2013.01); *G06T 19/006* (2013.01)

(58) Field of Classification Search
None
See application file for complete search history.

(56) References Cited

U.S. PATENT DOCUMENTS

2020/0225830 A1* 7/2020 Tang ..................... G06F 3/017
2021/0034319 A1* 2/2021 Wang .................. H04N 13/275
2021/0132687 A1* 5/2021 Luo ........................ G06F 3/011

FOREIGN PATENT DOCUMENTS

WO WO-2022076790 A1 * 4/2022

* cited by examiner

*Primary Examiner* — Patricia J Park
(74) *Attorney, Agent, or Firm* — Cognition IP, P.C.; Edward Steakley; Rajesh Fotedar (57) ABSTRACT

Various embodiments of an apparatus, methods, systems and computer program products described herein are directed to an Interaction Engine. According to various embodiments, Interaction Engine generates within a unified three-dimensional (3D) coordinate space, a virtual 3D medical model positioned according to a model pose. The Interaction Engine receives video data from a plurality of video sources. The Interaction Engine renders a first Augmented Reality (AR) display that includes concurrent display of the virtual 3D medical model and visualization of at least a portion of video data from a first video source. The Interaction Engine renders a second Augmented Reality (AR) display that includes concurrent display of the virtual 3D medical model and visualization of at least a portion of video data from a second video source.

8 Claims, 9 Drawing Sheets

STEREO VIDEO IN AUGMENTED REALITY

CROSS-REFERENCE TO RELATED APPLICATIONS

This application is a continuation-in-part of U.S. patent application Ser. No. 17/723,437, filed on Apr. 18, 2022, titled "USER INPUT AND VIRTUAL TOUCH PAD IN AUGMENTED REALITY FOR USE IN SURGICAL SETTINGS," the entirety of which is incorporated herein by reference. U.S. patent application Ser. No. 17/723,437 is a continuation-in-part application of U.S. patent application Ser. No. 17/194,191, filed on Mar. 5, 2021, titled "USER INPUT AND INTERFACE DESIGN IN AUGMENTED REALITY FOR USE IN SURGICAL SETTINGS," the entirety of which is incorporated herein by reference.

This application is a continuation-in-part of U.S. patent application Ser. No. 17/395,233, filed on Aug. 5, 2021 titled "MEDICAL INSTRUMENT WITH FIDUCIAL MARKERS," the entirety of which is incorporated herein by reference. U.S. patent application Ser. No. 17/395,233 is a continuation-in-part application of U.S. patent application Ser. No. 17/148,522, filed on Jan. 13, 2021 titled "INSTRUMENT-BASED REGISTRATION AND ALIGNMENT OF AUGMENTED REALITY ENVIRONMENTS," the entirety of which is incorporated herein by reference.

BACKGROUND

Conventional systems provide for the rendering of virtual reality and augmented reality environments. Such environments provide a visualization of various portions of the physical world as well as simulations of certain events that will or may occur in the physical world. These conventional systems include communication with input devices controlled by one or more users. The input devices allow the users to select certain types of actions and activities within the rendered environments. In many cases, these environments rendered by conventional systems may be specific to certain types of industries. For example, some conventional virtual reality environments may be used to simulate training situations for a type of worker with duties specific to an occupation. In another example, some conventional virtual reality environments may be used to model future events and visualize the occurrence and effects of the modeled future events on a particular physical geographical location.

SUMMARY

Various embodiments of an apparatus, methods, systems and computer program products described herein are directed to an Interaction Engine. The Interaction Engine generates within a unified three-dimensional (3D) coordinate space, a virtual 3D medical model positioned according to a model pose. The Interaction Engine receives video data from a plurality of video sources. For example, a plurality of video sources may be two cameras of a stereo real-time imaging source such as, according to non-limiting examples, an endoscope or an exoscope.

In various embodiments, the Interaction Engine renders a first Augmented Reality (AR) display that includes concurrent display of the virtual 3D medical model and visualization of at least a portion of video data from a first video source. The Interaction Engine renders a second Augmented Reality (AR) display that includes concurrent display of the virtual 3D medical model and visualization of at least a portion of video data from a second video source.

In some embodiments, the Interaction Engine receives first video data from a first camera of stereo real-time imaging source and renders visualization of the first video data in the first AR display. The Interaction Engine receives second video data from a second camera of the stereo real-time imaging source and renders visualization of the second video data in the second AR display.

In some embodiments, the Interaction Engine renders, in the respective AR display, controls of one or more types of camera parameters.

In some embodiments, the Interaction Engine renders, in the respective AR display, controls of one or more types of image parameters.

In some embodiments, the Interaction Engine renders, in the respective AR display, controls of one or more types of robotic arm control parameters.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
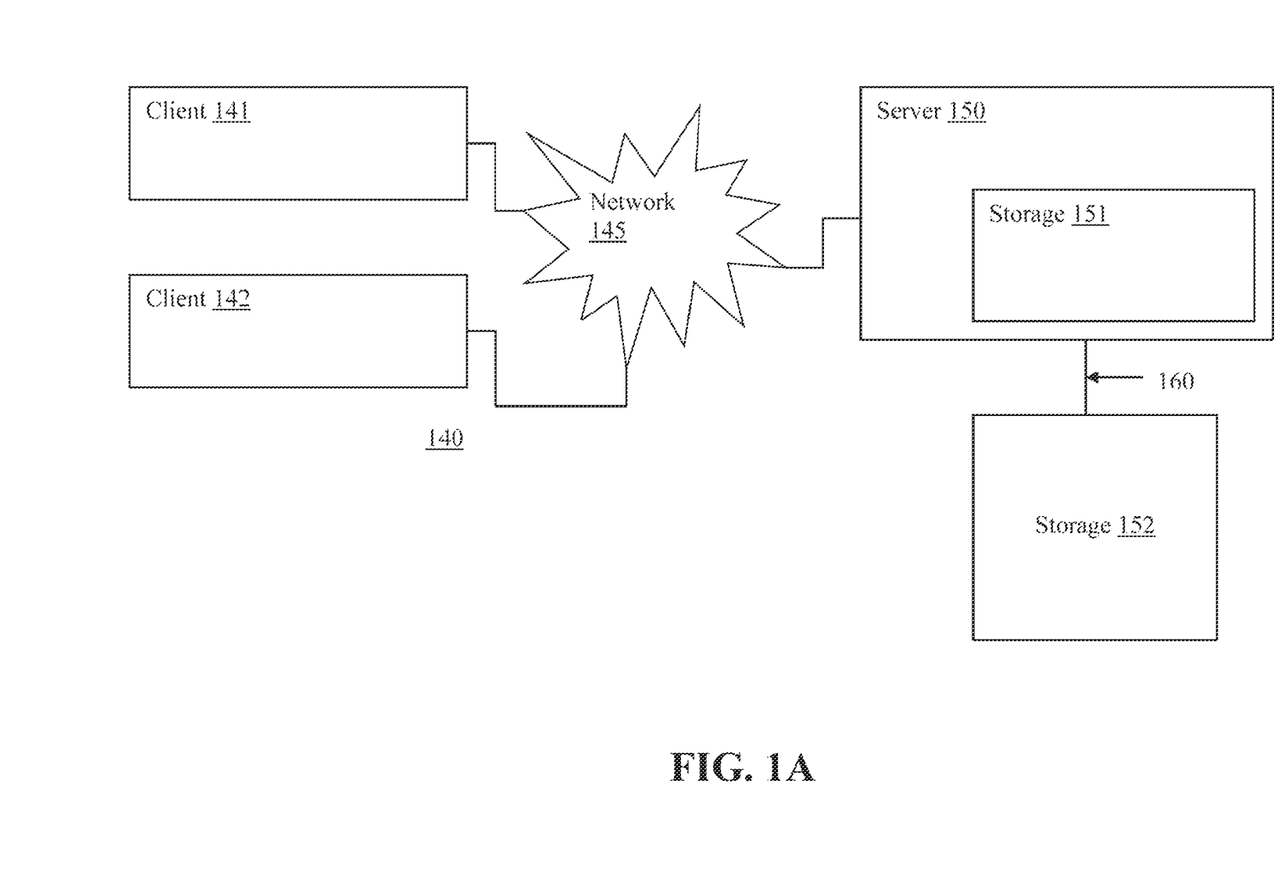
FIG. 1A is a diagram illustrating an exemplary environment in which some embodiments may operate.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method AR display 250 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
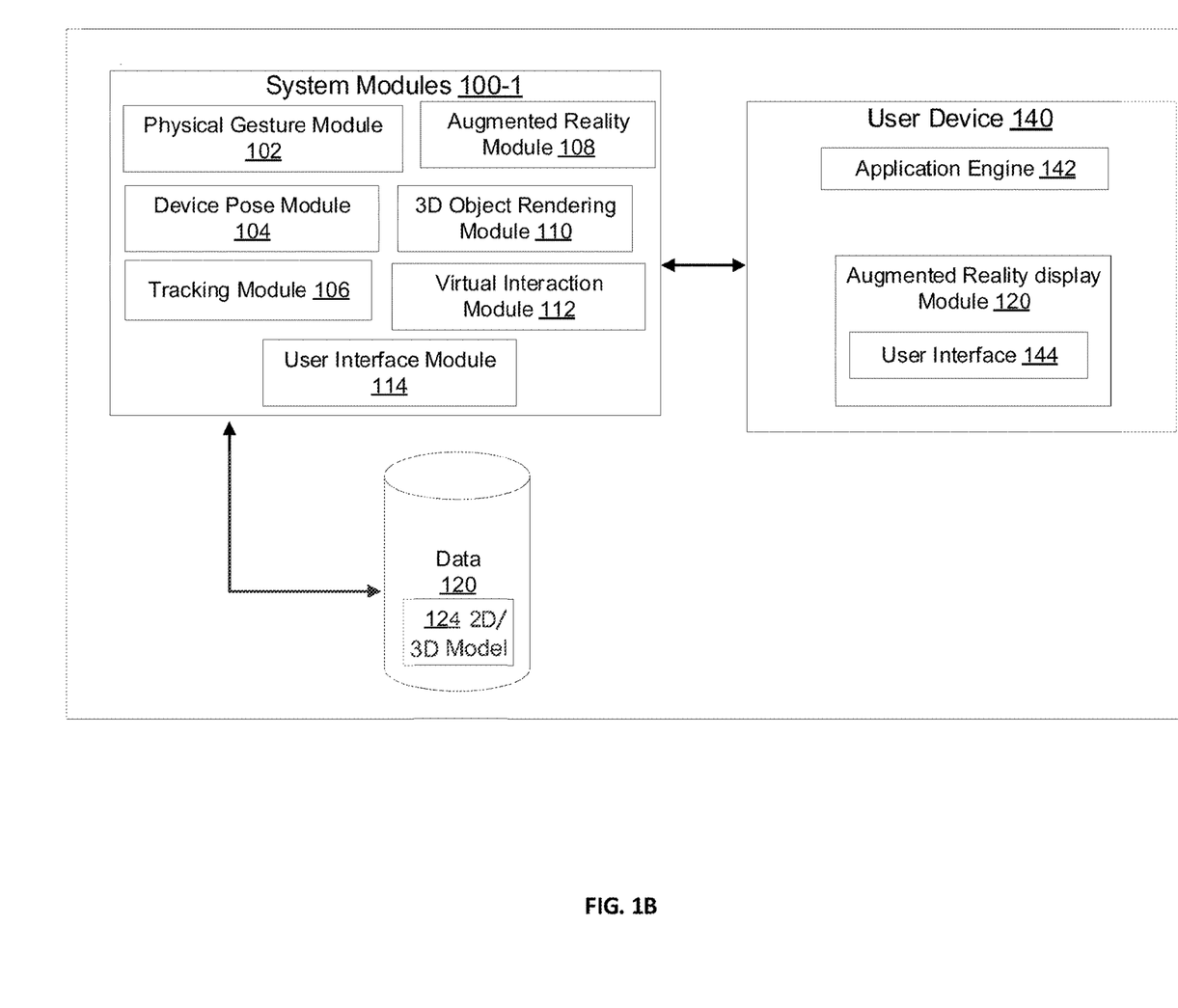
FIG. 1B is a diagram illustrating an exemplary environment in which some embodiments may operate.

FIG. 1B illustrates a block diagram of an example system 100 for an Interaction Engine that includes a physical gesture module 102, a device pose module 104, a tracking module 106, a an AR module 108, a 3D object rendering module 110, a virtual interaction module 112 and a user interface module 114. The system 100 may communicate with a user device 140 to display output, via a user interface 144 generated by an application engine 142. In various embodiments, the user device 140 may be an AR display headset device that further includes one or more of the respective modules 102, 104, 106, 108, 110, 112, 114.

The physical gesture module 102 of the system 100 may perform functionality, steps, operations, commands and/or instructions as illustrated in FIGS. 2, 3A, 3B, 4, 5 and 6 ("FIGS. 2-6").

The device pose module 104 of the system 100 may perform functionality, steps, operations, commands and/or instructions as illustrated in FIGS. 2-6.

The tracking module 106 of the system 100 may perform functionality, steps, operations, commands and/or instructions as illustrated in FIGS. 2-6.

The augmented reality module 108 of the system 100 may perform functionality, steps, operations, commands and/or instructions as illustrated in FIGS. 2-6.

The 3D object rendering module 110 of the system 100 may perform functionality, steps, operations, commands and/or instructions as illustrated in FIGS. 2-6.

The virtual interaction module 112 of the system 100 may perform functionality, steps, operations, commands and/or instructions as illustrated in FIGS. 2-6.

The user interface module 114 of the system 100 may perform functionality, steps, operations, commands and/or instructions as illustrated in FIGS. 2-6.

A database 120 associated with the system 100 maintains information, such as 3D medical model data 122, in a manner the promotes retrieval and storage efficiency and/or data security. In addition, the model data 122 may include rendering parameters, such as data based on selections and modifications to a 3D virtual representation of a medical model rendered for a previous Augmented Reality display. In various embodiments, one or more rendering parameters may be preloaded as a default value for our rendering parameter in a newly initiated session of the Interaction Engine.

Figure 2:
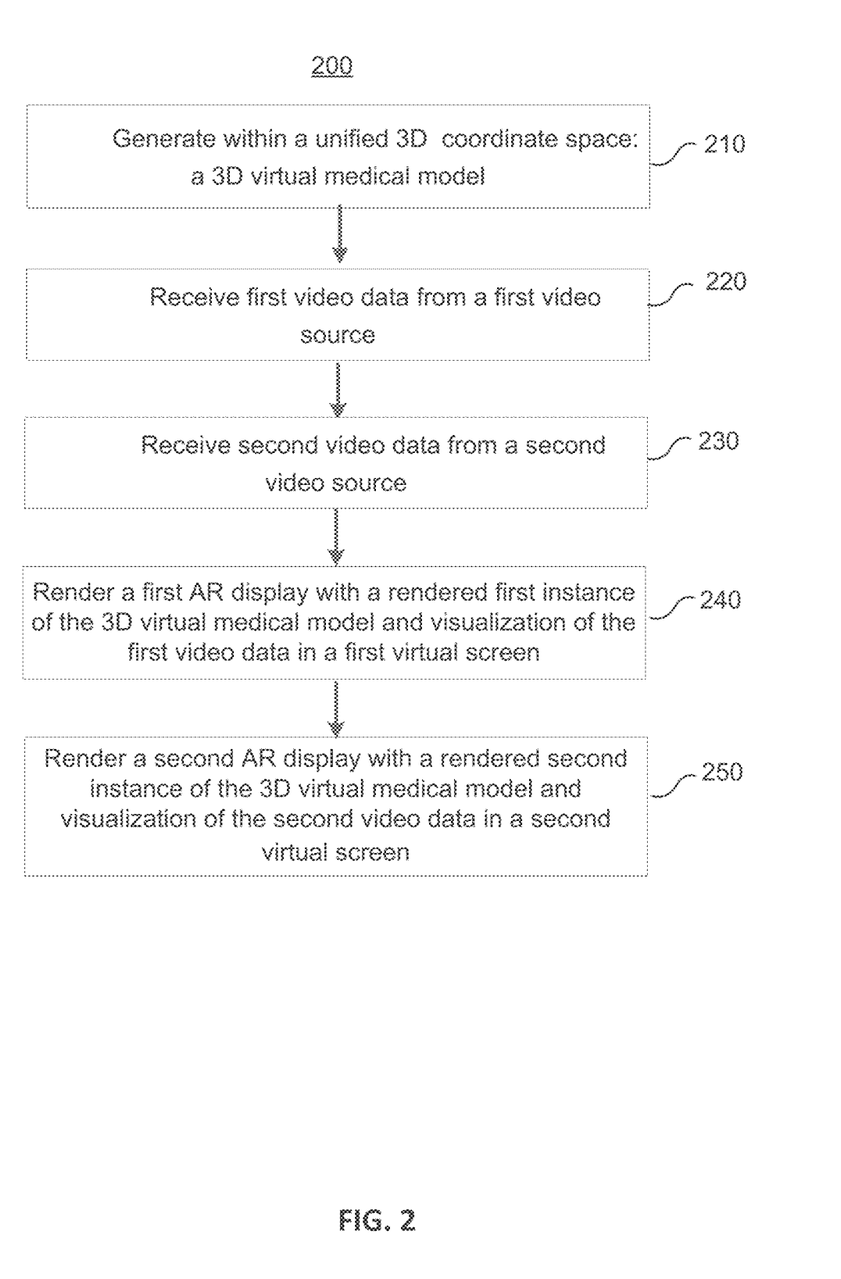
FIG. 2 is a diagram illustrating an exemplary method that may be performed in some embodiments.

As shown in flowchart 200 of FIG. 2, the Interaction Engine generates within a unified 3D coordinate space a 3D virtual medical model. (Act 210) The Interaction Engine receives first video data from a first video source. (Act 220) The Interaction Engine receives second video data from a second video source. (Act 230) It is understood that the first and second video sources may be disposed on (or be a component of) the same physical instrument, such as a stereo real-time imaging source. For example, the first video source may be a first camera of the stereo real-time imaging source currently physically situated within a patient's body. The second video source may be a second camera of the same stereo real-time imaging source. Both the first and second cameras may by concurrently capturing visual image data of the same portion of the patient's internal anatomy.

The Interaction Engine renders a first AR display with a rendered first instance of the 3D virtual medical model and visualization of the first video data in a first virtual screen.

(Act 240) The Interaction Engine renders a second AR display with a rendered second instance of the 3D virtual medical model and visualization of the second video data in a second virtual screen. (Act 250) According to one or more embodiments, the first AR display may be associated with a right eye lens of an AR headset device and the second AR display may be associated with a left eye lens of the same AR headset device. Both the first and second AR displays may be rendered concurrently by the AR headset device and each include rendered instances of the same visualization of the virtual 3D medical model.

In one or more embodiments, a user wearing the AR headset device can view the first video data in the first AR display via her right eye and can view the second video data in the second AR display via her left eye. Both the first and second AR displays present the same visualization of the virtual 3D medical model. Each of the user's eye perceives visualization of a different video although a difference between first and second video data may only slight since both are sourced from the same endoscope (or exoscope). When the user views the first and second AR displays via the headset device, the user's eyes perceive visualization of the first and second video data, thereby experiencing a more realistic level of depth perception of the endoscope (or the exoscope) views being captured by the respective cameras.

Figure 3A:
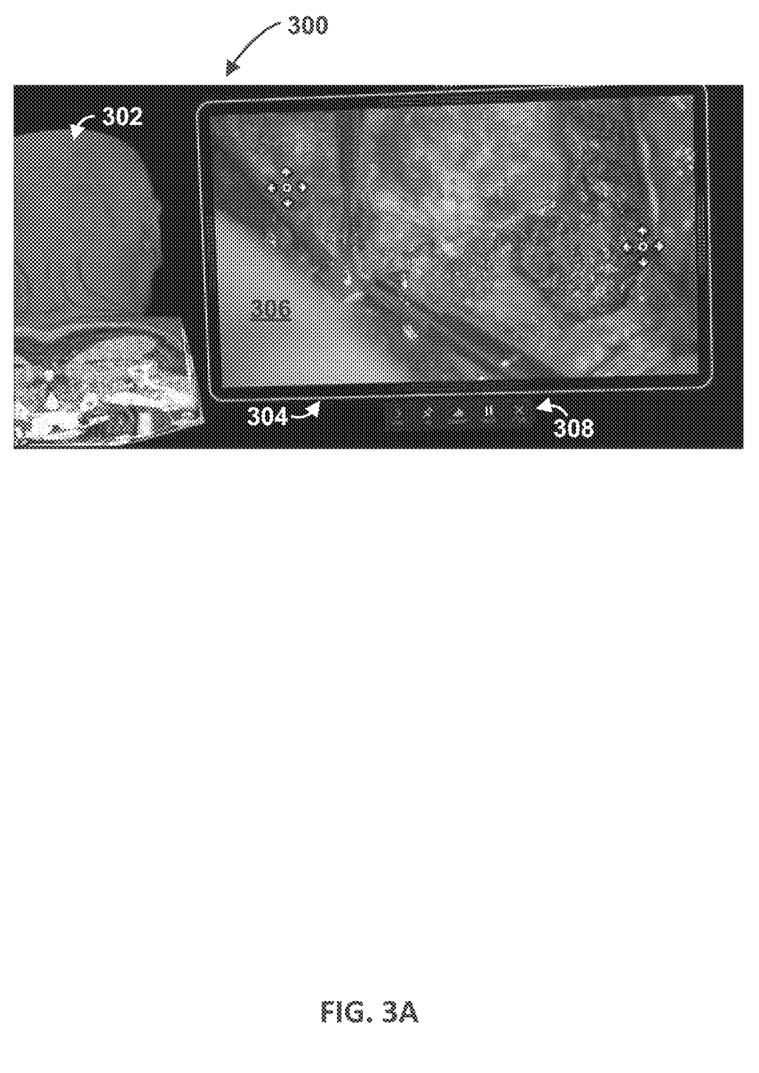
FIG. 3A is a diagram illustrating an exemplary environment in which some embodiments may operate.

As shown in FIG. 3A, the Interaction Engine generates a first AR display 300 that includes a rendered 3D virtual medical model 302 ("3D medical model") and a virtual screen 304. The virtual screen 304 for portrayal of visualization of first video data from a first video source 306. A menu 308 that corresponds to the virtual screen 304 may be included in the AR display. The menu 308 includes one or more selectable virtual objects for respective different types of video controls for controlling visualization within the virtual screen 304.

Figure 3B:
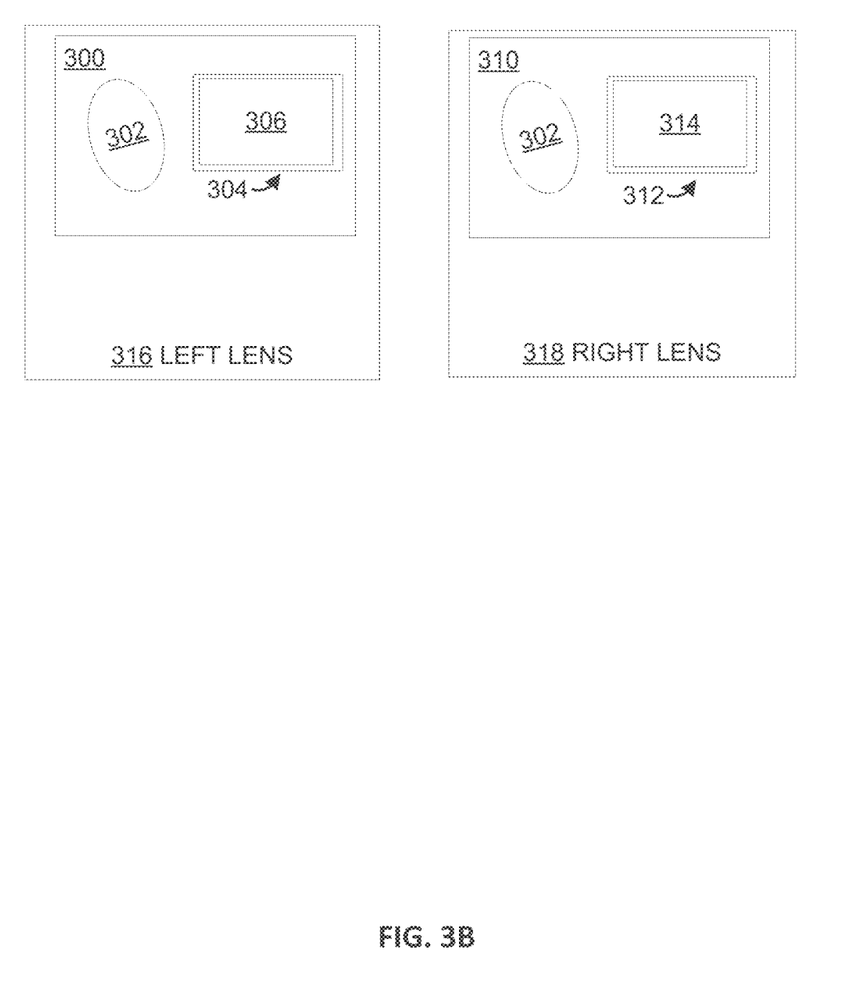
FIG. 3B is a diagram illustrating an exemplary environment in which some embodiments may operate.

As shown in FIG. 3B, the Interaction Engine generates a second AR display 310 concurrently with generation of a first AR display 300. The second AR displays the same rendered 3D medical model 302. That is, the first AR display 300 includes a first instance of the rendered 3D medical model 302 and the second AR display includes a second instance of the rendered 3D medical model. The second AR display 310 includes a virtual screen 312 for portrayal of visualization of second video data from a second video source 314. A menu may also be included in the second AR Display 310 as corresponding to the virtual screen 312. Such a menu includes one or more selectable virtual objects for respective different types of video controls for controlling visualization within the virtual screen 312.

The Interaction Engine may detect, via an AR headset device worn be a user, one or more physical gestures of the user that represent various types of virtual interactions and/or user selections associated with the rendered 3D medical model 302. According to various embodiments, the Interaction Engine may detect performance of physical gestures to modify of a pose of the rendered 3D medical model 302, modify a display of position of the rendered 3D medical model 302 and/or select a portion(s) of the rendered 3D medical model 302.

Based on detected physical gestures, the Interaction Engine modifies the rendered 3D medical model 302 and/or display of the rendered 3D medical model 302 and concurrently updates the instances of the 3D medical model 302 in both the first and second AR displays 300, 310. For example, according to various embodiments, the Interaction Engine tracks a user's movements in the physical world and represents such movements as one or more virtual interactions rendered within a unified 3D coordinate space. Such virtual interactions may result in concurrent movement and manipulation of both of the rendered instances of the 3D medical model 302 in both the first and second AR displays 300, 310.

In one or more embodiments, the Interaction Engine may concurrently implement and render a virtual interaction(s) (and/or virtual interaction selections) in both the first and second AR displays 300, 310. As such, the same virtual interaction(s) may be visualized in both the first and second AR displays 300, 310 at the same time, where the virtual interaction(s) is based on the same detected user movements and/or gestures.

In various embodiments, such virtual interactions may include one or more of following: a selection virtual interaction, a zoom-in virtual interaction, a zoom-out virtual interaction, a rotation virtual interaction, a windowing virtual interaction, a tap-to-place virtual interaction, a clipping plane virtual interaction, a multi-axis cropping virtual interaction, a slice-scroll bar virtual interaction and parameter tuning virtual interaction, a scout virtual interaction, an annotation virtual interaction, a reset virtual interaction and/or one or more types of virtual interactions related to a 3D virtual slate as described in U.S. patent application Ser. No. 17/194,191. In one or more embodiments, such virtual interactions may also include one or more of the following: a windowing slate virtual interaction, a brightness slate virtual interaction, a clipping plane slate virtual interaction and/or an opacity virtual slate interaction as described in U.S. patent application Ser. No. 17/723,437.

In various embodiments, the Interaction Engine renders, in each respective AR display 300, 310, one or more virtual objects representing various types of controls. For example, the controls may be one or more camera parameters, one or more image parameters and/or one or more robotic arm control parameters. In various embodiments, the camera parameters may include one or more of: camera focal distance adjustment, execution of optical zoom, modification of exposure time and/or modification of brightness levels. Selection of a virtual object that corresponds to a camera parameter triggers physical actions at one or more of the cameras that are a video source for the Interaction Engine.

In various embodiments, the image parameters for post-processing of video data received from a video source(s). The image parameters may include one or more of: visual disparity adjustment, contrast adjustment, brightness adjustment and cropping of a region of video data.

In various embodiments, the video source(s), such as a plurality of cameras, may be disposed or situated on a physical instrument (i.e. the stereo real-time imaging source) that is attached to or under the control and guidance of a robotic arm. One or more virtual objects representing controls may be rendered in the first and second AR displays 300, 310 for controlling the movement and position of the robotic arm. As such, a current pose of the physical instrument (i.e. the stereo real-time imaging source) can be continually modified and updated by selection and manipulation of the virtual object controls.

In some embodiments, one or more fiducial markers may be disposed on the physical instrument (i.e. the stereo real-time imaging source) as well on a patient. The Interaction Engine may have data representing virtual coordinates that map to one or more portions of the patient's internal and/or external anatomy. Since the physical instrument (i.e. the stereo real-time imaging source) may include a camera(s) that is moved within the patient, the Interaction Engine determines the pose of the physical instrument in relation to the pose of the patient. The Interaction Engine may perform one or more spatial transformations with respect to the unified 3D coordinate space to map the coordinates of the pose of the physical instrument to virtual coordinates. The Interaction Engine can thereby render a representation of the physical instrument in the first and the second AR displays, 300, 310. The representation of the physical instrument (i.e. the stereo real-time imaging source) may be a virtual object displayed in the first and the second AR displays, 300, 310.

The virtual object representing the physical instrument (i.e. the stereo real-time imaging source) may be displayed in the first and the second AR displays, 300, 310 based on a current pose of the physical instrument (i.e. the stereo real-time imaging source) tracked by the Interaction Engine according to the one or more fiducial markers on the physical instrument and/or the patient. In some embodiments, the virtual object representing the physical instrument (i.e. the stereo real-time imaging source) may be selection and manipulated according to one or more detected physical gestures detected by the Interaction Engine.

In some embodiments, rendering of the physical instrument can be visualized within the virtual object representing the rendered instances of the 3D medical model 302.

Figure 4:
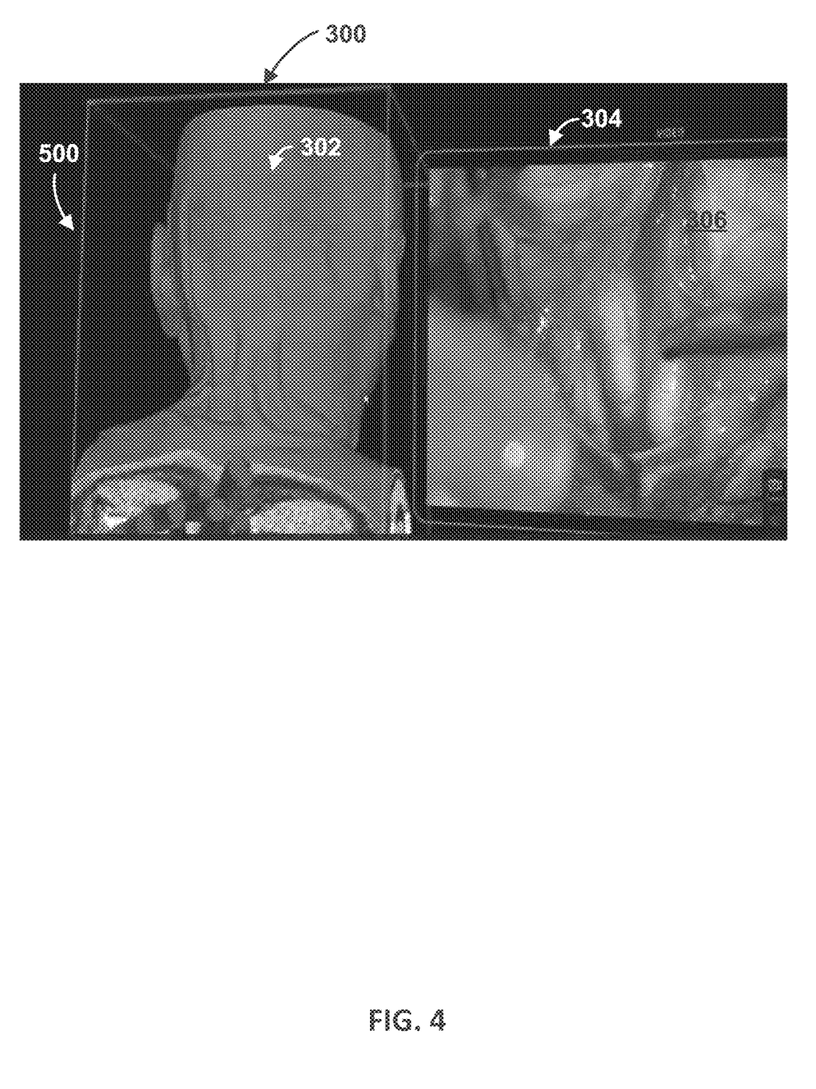
FIG. 4 is a diagram illustrating an exemplary environment in which some embodiments may operate.

As shown in FIG. 4, the Interaction Engine generates the first AR display 300 with a representation of 3D virtual representation of a medical model container 500 ("virtual container 500") that includes a rendered instance of the 3D medical model 302 and/or a 3D virtual representation of a body part of the user (such as, for example, "3D virtual hands").

The Interaction Engine renders the instance of the 3D medical model 302 in the virtual container 500 based on model pose data which describes an orientation and position of the rendering of the 3D medical model 302. The Interaction Engine applies the model pose data to 3D medical model data to determine one or more positional coordinates in the unified 3D coordinate system for a portion(s) of model data. The determined positional coordinates may further map to positional coordinates of a 3D interior space inside the virtual container 202.

The Interaction Engine further renders the 3D medical model 302 based on a current device pose of an AR headset device worn by the user. The current device pose represents a current position and orientation of the AR headset device in the physical world. The Interaction Engine translates the current device pose to a position and orientation within the unified 3D coordinate system to determine the user's perspective view of the first AR display 300.

The Interaction Engine generates an instance of a rendered 3D medical model 302 in the virtual container 500 according to the model pose data for display to the user in the first AR display 300 according to the user's perspective view. In addition, Interaction Engine generates an instance of the rendered 3D medical model 302 in the virtual container 500 according to the model pose data for display to the user in the second AR display 310 according to the user's perspective view. It is understood that the respective instances of the rendered 3D medical model 302 are concurrently rendered and displayed in the first AR display 300 and the second AR display 310.

Figure 5:
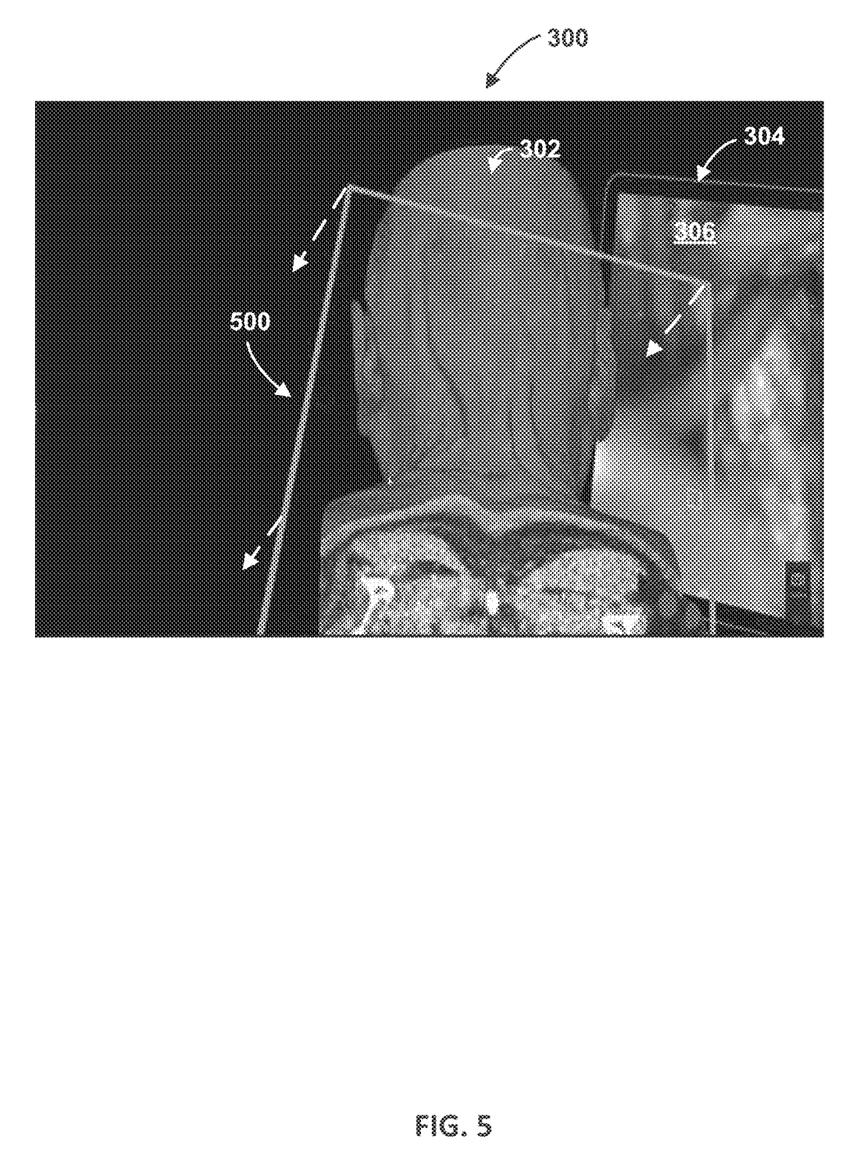
FIG. 5 is a diagram illustrating an exemplary environment in which some embodiments may operate.

According to various embodiment, the Interaction Engine detects selection of a clipping plane virtual interaction ("clipping plane interaction") based on detecting one or more physical gestures. For example, the Interaction Engine may detect selection of the clipping plane virtual interaction from a menu. As shown in FIG. 5, the Interaction Engine displays a clipping plane virtual object 500 ("clipping plane") at a first display position. The Interaction Engine determines that the clipping plane 500 intersects with the 3D virtual medical model 302 due to the first display position of the clipping plane 500. The Interaction Engine determines medical model data for the 3D virtual medical model 302 in its current model pose, whereby the identified medical model data represents medical model data that maps to one or more of the positional coordinates of the intersection between the 3D virtual medical model 302 and the clipping plane 500. For example, the Interaction Engine determines medical model data that represents internal anatomical regions. The Interaction Engine updates the 3D virtual medical model 302 to include portrayal of the identified medical model data and concurrently displays the updated 3D virtual medical model 302 and the clipping plane 500 at its display position in both the first AR display 300 and the second AR display 310.

The Interaction Engine may represent movement of the clipping plane 500 based on movement of the user's head as represented by pose data generated by the AR headset device as the user moves the headset device. It is understood that FIG. 5 illustrates the first AR display 300. However, display and movement of the clipping plane 500 is concurrently rendered by the Interaction Engine in the second AR display 310 while both the first and the second AR display 300, 310 each include rendered instances of the 3D virtual medical model 302 and renderings of different virtual screens 304, 312.

Figure 6:
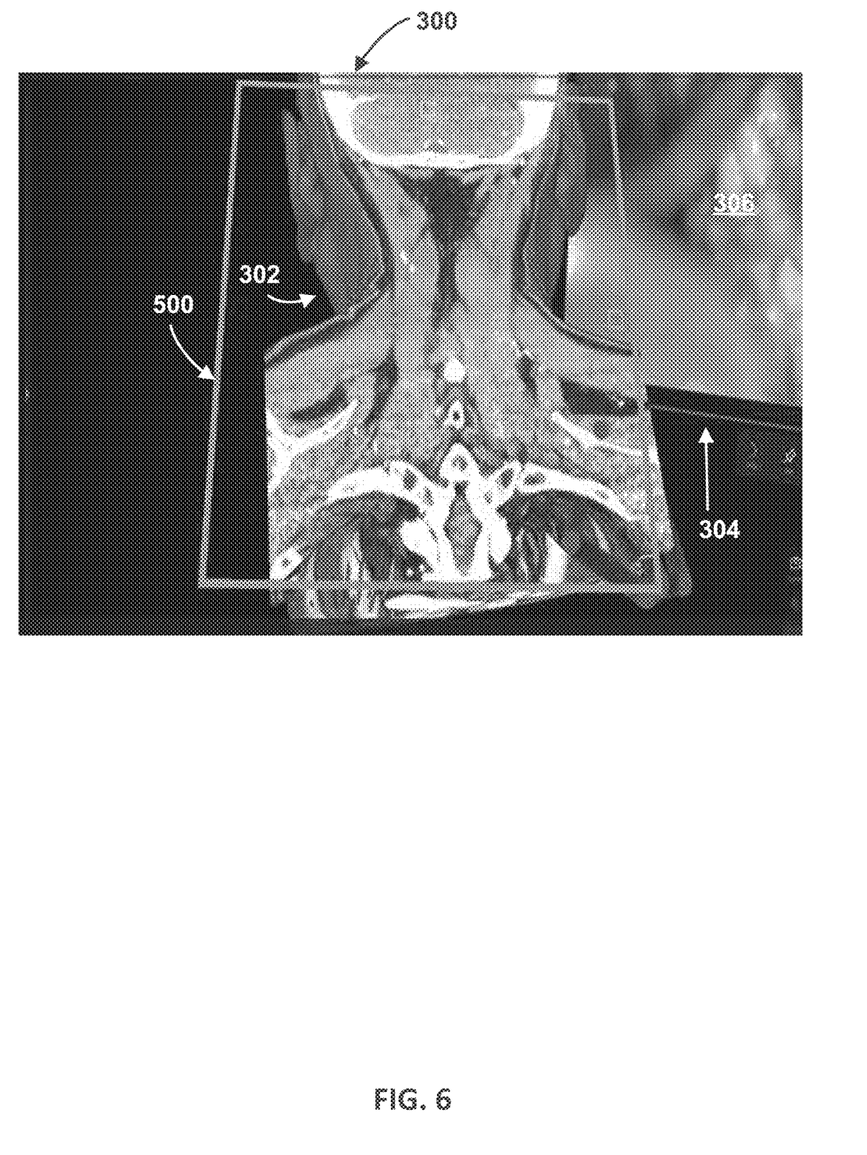
FIG. 6 is a diagram illustrating an exemplary environment in which some embodiments may operate.

As shown in FIG. 6, the Interaction Engine renders graphic results of movement of the clipping plane 500 towards the 3D virtual medical model 302 as the user physically steps forward and/or physically moves the AR headset device in a particular direction(s). The Interaction Engine determines that movement of the clipping plane 500 from the first display position to a second display position results in an updated intersection with the 3D virtual medical model 302. The Interaction Engine determines medical model data for the 3D virtual medical model 302 in its current model pose, whereby the identified medical model data represents medical model data that maps to one or more of the positional coordinates of the updated intersection between the 3D virtual medical model 302 and the clipping plane 500. For example, the Interaction Engine determines medical model data that represents different internal anatomical regions than those visualized when the clipping plane was displayed in the first displayed position in the first AR display 300 and the second AR display 310. The Interaction Engine updates the 3D virtual medical model 302 to include portrayal of the newly identified medical model data for the updated intersection and concurrently displays the updated 3D virtual medical model 302 and the clipping plane 500 at the second display position in both the first AR display 300 and the second AR display 310.

It is understood that FIG. 6 illustrates the first AR display 300. However, display and movement of the clipping plane 500 is concurrently rendered by the Interaction Engine in the second AR display 310 while both the first and the second AR display 300, 310 each include rendered instances of the 3D virtual medical model 302 and renderings of different virtual screens 304, 312.

In various embodiments, the Interaction Engine accesses one or more storage locations that contain respective portions of 3D medical model data. The 3D medical model data may include a plurality of slice layers of medical data associated with external and internal anatomies. For example, the 3D medical model data may include a plurality of slice layers of medical data for illustrating external and internal anatomical regions of a user's head, brain and skull. It is understood that various embodiments may be directed to generating displays of any internal or external anatomical portions of the human body and/or animal bodies.

The Interaction Engine renders the 3D virtual medical model in the AR display based on the 3D medical model data. In addition, the Interaction Engine renders the 3D virtual medical model on model pose data which describes an orientation and position of the rendering of the medical model. The Interaction Engine applies the model pose data to the 3D medical model data to determine one or more positional coordinates in the unified 3D coordinate system for portion of model data of each slice layer.

The Interaction Engine further renders the 3D virtual medical model based on a current device pose of an AR headset device worn by the user. The current device pose represents a current position and orientation of the AR headset device in the physical world. The Interaction Engine translates the current device pose to a position and orientation within the unified 3D coordinate system to determine the user's perspective view of the AR display. The Interaction Engine generates a rendering of the 3D virtual medical model according to the model pose data for display to the user in the AR display according to the user's perspective view.

Various embodiments described herein provide a selection functionality for selection of various types of display AR virtual objects, components and/or the tool based on directional data associated with the 3D virtual hands. For example, the Interaction Engine tracks the user's hands (and/or any other portion(s) of the user's body) via one or more tracking algorithms to determine hand (and/or body portion(s)) direction(s) to further be utilized in determining whether one or more gestures or movements performed by the user indicate selection of one or more AR virtual objects, components and/or one or more types of functionalities accessible via the AR display. For example, the Interaction Engine may track the user's hands and determine respective positions and changing positions of one or more hand joints. In various embodiments, the Interaction Engine may implement a simultaneous localization and mapping (SLAM) algorithm.

The Interaction Engine may generate direction data (or directional data) based at least in part on average distances between the user's palm and the user's fingers and/or hand joints. In some embodiments, the Interaction Engine generates direction data based on detected directional movement of the an AR headset device worn by the user. The Interaction Engine determines that the direction data indicates a position and orientation of the user's hands indicates a portion of an AR virtual object, component, one or more types of functionalities and/or the 3D virtual medical model with which the user seeks to select and/or virtually interact with.

According to various embodiments, the Interaction Engine may implement a collision algorithm to determine an AR virtual object, component, one or more types of functionalities and/or a portion of the 3D virtual medical model the user seeks to select and/or virtually interact with. For example, the Interaction Engine may track the user's hands and display the 3D virtual hands in the AR display according to respective positional coordinates in the unified 3D coordinate system that correspond to the orientation of the user's hands in the physical world.

The Interaction Engine may detect that one or more positional coordinates for displaying the 3D virtual hands in the AR display may overlap (or be the same as) one or more positional coordinates for displaying an AR virtual object, component, one or more types of functionalities (such as, for example, performance of various types of virtual interactions) and/or the portion of the 3D virtual medical model. In response to detecting the overlap, the Interaction Engine may determine that the user seeks to select and/or virtually interact with the corresponding AR virtual object, component, one or more types of functionalities and/or the portion of the 3D virtual medical model.

According to various embodiments, upon determining the user seeks to select and/or virtually interact with an AR virtual object, component, one or more types of functionalities and/or the portion of the 3D virtual medical model, the Interaction Engine may detect one or more changes in hand joint positions and identify the occurrence of the changes in hand joint positions as a performed selection function and/or a virtual interaction.

According to various embodiments, the Interaction Engine detects physical gestures performed by the user. In various embodiments, the Interaction Engine may include one or more cameras or sensors for visually tracking the user's physical hand movements and respective positions of the user's hands and current/updated positions of one or more of the user's hand joints. For example, the one or more cameras may be disposed on the AR headset device. In various embodiments, the Interaction Engine may further receive head pose tracking data and/or eye tracking data from the AR headset device worn by the user. The Interaction Engine may generate direction data (i.e., directional data) or augment direction data based at least in part on the head pose data and/or the eye tracking data. For example, the head pose tracking data may be based on a position(s) and orientation(s) of the AR headset device in the physical world as the user moves the user's head. For example, the eye tracking data may be based on data generated by one or more cameras or sensors on the AR headset device directed at the user's eyes in order to track movements of one or more portions of the user's eyes and changes of positions of those one or more portions of the user's eyes.

Figure 7:
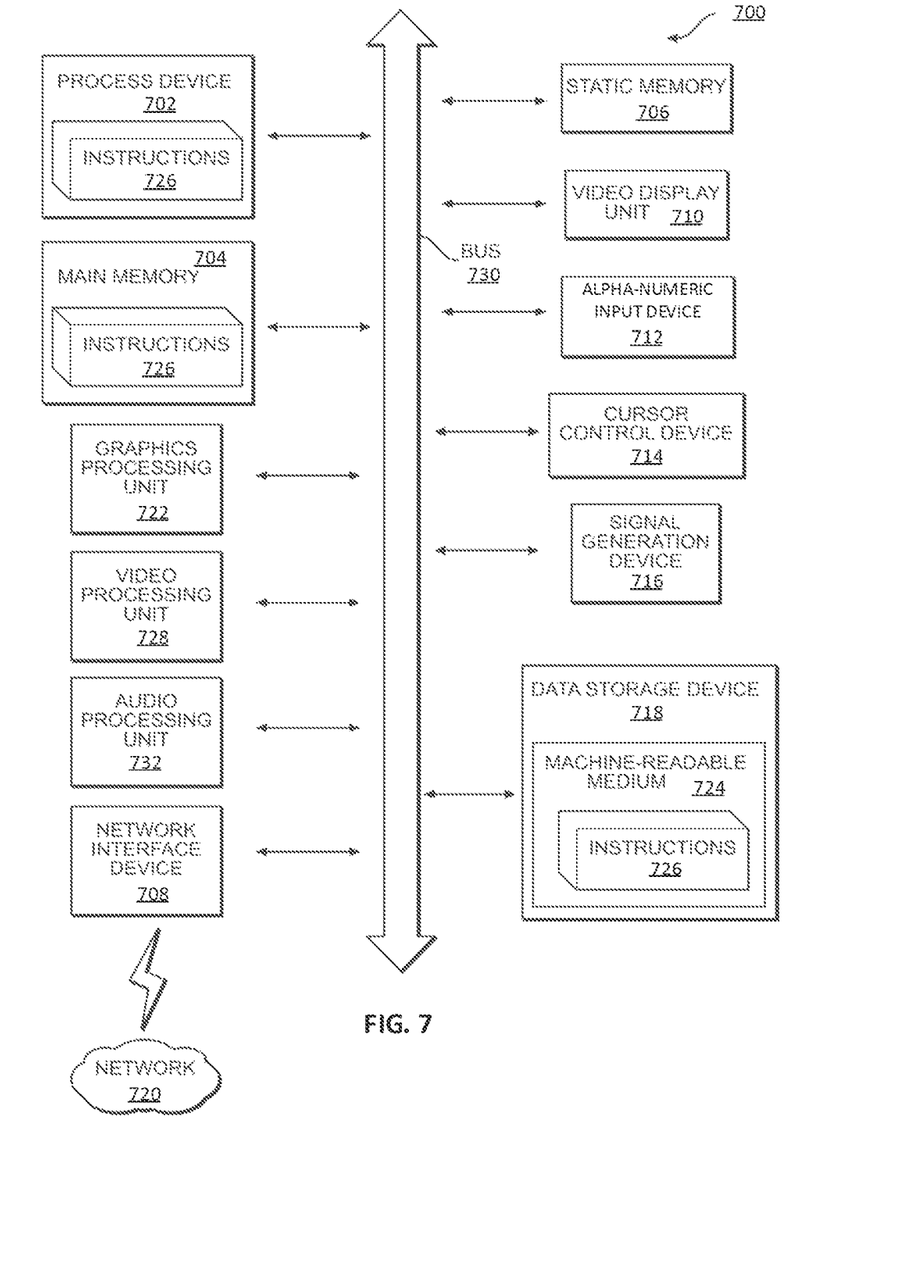
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

What is claimed is:

1. A system comprising one or more processors, and a non-transitory computer-readable medium including one or more sequences of instructions that, when executed by the one or more processors, cause the system to perform operations comprising:
   generating within a unified three-dimensional (3D) coordinate space, a virtual 3D medical model positioned according to a model pose;
   receiving video data from a plurality of video sources;
   rendering a first Augmented Reality (AR) display that includes concurrent display of the virtual 3D medical model and visualization of at least a portion of video data from a first video source;
   rendering a second AR display that includes concurrent display of the virtual 3D medical model and visualization of at least a portion of video data from a second video source;
   detecting a first physical gesture indicative of identifying a selection to initiate a type of virtual interaction from a plurality of types of virtual interactions based on the detected first physical gesture;
   concurrently modifying the first AR display and the second AR display, via the AR headset device, by (a) initiating display of a selectable first virtual object in the first AR display that corresponds with the selected type of virtual interaction and by (b) initiating display of a selectable second virtual object in the second AR display that corresponds with the selected type of virtual interaction;
      wherein rendering the first AR display further comprises: rendering a first virtual screen portraying the visualization of the video from the first video source concurrently with display of the first virtual object; and
      wherein rendering the second AR display further comprises: rendering a second virtual screen portraying the visualization of the video from the second video source concurrently with display of the second virtual object, the first and the second virtual objects each comprising an instance of a same type of virtual object.

2. The system of claim 1, further comprising:
   wherein rendering the first AR display comprises: rendering the first AR display with respect to a first lens of an AR headset device; and
   wherein rendering the second AR display comprises: rendering the second AR display with respect to a second lens of the AR headset device.

3. The system of claim 2, further comprising:
   detecting the first physical gesture;
   concurrently modifying the first and the second AR display, via the AR headset device, by rendering in the first and the second AR display a type of movement of a virtual 3D body part representation based on the detected first physical gesture;
   identifying selection of a type of virtual interaction to be initiated based on the type of movement of the virtual 3D body part representation; and
   concurrently modifying the first and the second AR display, via the AR headset device, by initiating display in the first and the second AR of a selectable virtual object that corresponds with the selected type of virtual interaction.

4. The system of claim 1, wherein rendering a respective AR display comprises:
   rendering, in each respective AR display, controls comprising at least one of: one or more camera parameters and image parameters and robotic arm control.

5. The system of claim 4, further comprising:
wherein receiving video data comprises: receiving video data based on visual imagery captured by one of a first endoscope and a first exoscope;
receiving one or more instances of virtual coordinates based on respective physical poses of one of the first endoscope and the first exoscope.

6. A computer program product comprising a non-transitory computer-readable medium having a computer-readable program code embodied therein to be executed by one or more processors, the program code including instructions to:
generating within a unified three-dimensional (3D) coordinate space, a virtual 3D medical model positioned according to a model pose;
receiving video data from a plurality of video sources;
rendering a first Augmented Reality (AR) display that includes concurrent display of the virtual 3D medical model and visualization of at least a portion of video data from a first video source;
rendering a second AR display that includes concurrent display of the virtual 3D medical model and visualization of at least a portion of video data from a second video source;
detecting a first physical gesture indicative of a selection to initiate a type of virtual interaction from a plurality of types of virtual interactions based on the detected first physical gesture;
concurrently modifying the first AR display and the second AR display, via the AR headset device, by (a) initiating display of a selectable first virtual object in the first AR display that corresponds with the selected type of virtual interaction and by (b) initiating display of a selectable second virtual object in the second AR display that corresponds with the selected type of virtual interaction;
wherein rendering the first AR display further comprises: rendering a first virtual screen portraying the visualization of the video from the first video source concurrently with display of the first virtual object; and
wherein rendering the second AR display further comprises: rendering a second virtual screen portraying the visualization of the video from the second video source concurrently with display of the second virtual object, the first and the second virtual objects each comprising an instance of a same type of virtual object.

7. The computer program product of claim 6, further comprising:
detecting the first physical gesture;
concurrently modifying the first and the second AR display, via the AR headset device, by rendering in the first and the second AR display a type of movement of a virtual 3D body part representation based on the detected first physical gesture;
identifying selection of a type of virtual interaction to be initiated based on the type of movement of the virtual 3D body part representation.

8. The computer program product of claim 7, further comprising:
detecting a second physical gesture based on a first change of pose data of the AR headset device, the first change of pose data representing a change of a position and orientation of the AR headset device in the unified 3D coordinate space;
determining a second display position of the selectable virtual object based on the first change of pose data of the AR headset device, the selectable virtual object comprising a virtual 3D clipping plane;
determining a first intersection between the virtual 3D clipping plane at the second display position and the rendered virtual 3D medical model at a current model pose;
identifying one or more portions of non-rendered 3D medical model data for the virtual 3D medical model in the current model pose that map to the first intersection;
concurrently modifying the first and the second AR display, via the AR headset device, by rendering in the first and the second AR display the virtual clipping plane at the second display position; and
wherein concurrently modifying the first and the second AR display comprises concurrently rendering:
(i) a first instance of the virtual clipping plane at the second display position in the first AR display and a first instance of the virtual 3D medical model portraying the identified one or more portions of 3D medical model data that map to the first intersection while the first AR display renders visualization of video from the first video source in the first virtual screen; and
(ii) a second instance of the virtual clipping plane at the second display position in the second AR display and a second instance of the virtual 3D medical model portraying the identified one or more portions of 3D medical model data that map to the first intersection while the second AR display renders visualization of video from the second video source in the second virtual screen.

* * * * *